(12) United States Patent
Christianson et al.

(10) Patent No.: US 9,688,467 B2
(45) Date of Patent: Jun. 27, 2017

(54) GYRATOR FEEDER

(71) Applicant: Richard Christianson, Maple Grove, MN (US)

(72) Inventors: Richard Christianson, Maple Grove, MN (US); Richard Kraus, Barrington, IL (US)

(73) Assignee: DYNAMIC AIR INC, St. Paul, MN (US)

(*) Notice: Subject to any disclaimer, the term of this patent is extended or adjusted under 35 U.S.C. 154(b) by 146 days.

(21) Appl. No.: 14/825,026

(22) Filed: Aug. 12, 2015

(65) Prior Publication Data

US 2016/0046439 A1 Feb. 18, 2016

Related U.S. Application Data

(63) Continuation of application No. 11/417,670, filed on May 4, 2006, now abandoned.

(51) Int. Cl.

| | |
|---|---|
| *B65D 88/66* | (2006.01) |
| *B65D 90/54* | (2006.01) |
| *B65G 27/20* | (2006.01) |
| *B65G 65/44* | (2006.01) |

(52) U.S. Cl.
CPC .......... *B65D 88/66* (2013.01); *B65D 90/54* (2013.01); *B65G 27/20* (2013.01); *B65G 65/44* (2013.01)

(58) Field of Classification Search
CPC ........ B65D 88/66; B65D 90/54; B65G 65/44; B65G 27/20
USPC ........ 222/171, 310, 333, 547, 198–200, 196
See application file for complete search history.

(56) References Cited

U.S. PATENT DOCUMENTS

| | | | | |
|---|---|---|---|---|
| 2,534,442 A | * | 12/1950 | Harvey | A01K 39/012 |
| | | | | 119/53 |
| 2,828,053 A | * | 3/1958 | Kast | B65G 65/44 |
| | | | | 198/769 |
| 4,530,431 A | * | 7/1985 | Spurlin | B65D 88/66 |
| | | | | 198/534 |

* cited by examiner

*Primary Examiner* — Paul R Durand
*Assistant Examiner* — Robert Nichols, II
(74) *Attorney, Agent, or Firm* — Jacobson & Johnson LLC (57) ABSTRACT

A gyrator feeder that gyrates a dispensing member to uniformly and circumnavigating dispense material by generating a true circular orbital vibratory motion in the dispensing member by either rotating an offset weight along a vertical central axis of the dispensing member or by positioning vibratory motors diametrical opposite from each other on a gyrator housing and synchronizing the vibratory motors with each other to thereby dispense material.

10 Claims, 10 Drawing Sheets

GYRATOR FEEDER

CROSS REFERENCE TO RELATED APPLICATIONS

This application is a continuation of application Ser. No. 11/417,670, filed May 4, 2006.

FIELD OF THE INVENTION

This invention relates generally to bin feeders and, more specifically, to a gyrator feeder.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of vibrating bin dischargers is known in the art. Typically, a vibrating bin discharger includes a cone that is placed beneath a hopper outlet with the cone vibrating in an up and down motion to propel material from the hopper. A gate is positioned in the hopper to shut off the flow of material from the hopper when the vibrating bin discharger is not in use. One of the disadvantages of the known vibrating bin dischargers is that the material can become compacted as the bin discharger vibrates. Another disadvantage is that the vibration of the cone requires large power requirements since the material in the hopper is lifted up during the vibration cycle. Another disadvantage is that if the material contains both large and small particles the vibrator motion can cause segregation of the large and small particles through the up and down motion on the material.

U.S. Pat. No. 4,545,509 discloses a bin activator with a central feed and a vibration generator located radially offset from the center. While the vibratory action is described as generating a circular orbital motion to the lower bowl the actual motion is not a true circular orbital vibratory motion since the vibration motors are not located at the central vertical axis of the bin activator. As a result of the positioning of the vibratory motors the vibratory motion the cone does not actually follow a circular path. As a result the feeder does not generate a uniform 360-degree delivery of material from a circular opening.

A further difficult with the bin activator shown in U.S. Pat. No. 4,545,509 is that angle of the lower cone is so shallow that material is maintained in the lower bowl rather than being emptied out each time the activator is shut off.

In contrast to the vibrating bin discharges the present invention uses gyrations of a dispensing member to control the flow of material with substantially true circular orbital vibratory motion.

SUMMARY OF THE INVENTION

Briefly, the present invention comprises a gyrator feeder that has a dispensing member that moves to uniformly dispense material from the hopper. To provide flow shut off without use of a gate, a lip on the dispensing ledge of the dispensing member is positioned so that material retained on the dispensing ledge is maintained at an angle less than the angle of repose of the material. The gyrator feeder dispenses material uniformly and circumnavigatingly through a gyrator that generates a true circular orbital vibratory motion in the dispensing member by either rotating an offset weight along a vertical central axis of the dispensing member or by positioning vibratory motors diametrical opposite from each other on a gyrator housing and synchronizing the vibratory motors with each other to thereby dispense material.

DESCRIPTION OF THE PREFERRED EMBODIMENT

Figure 1:
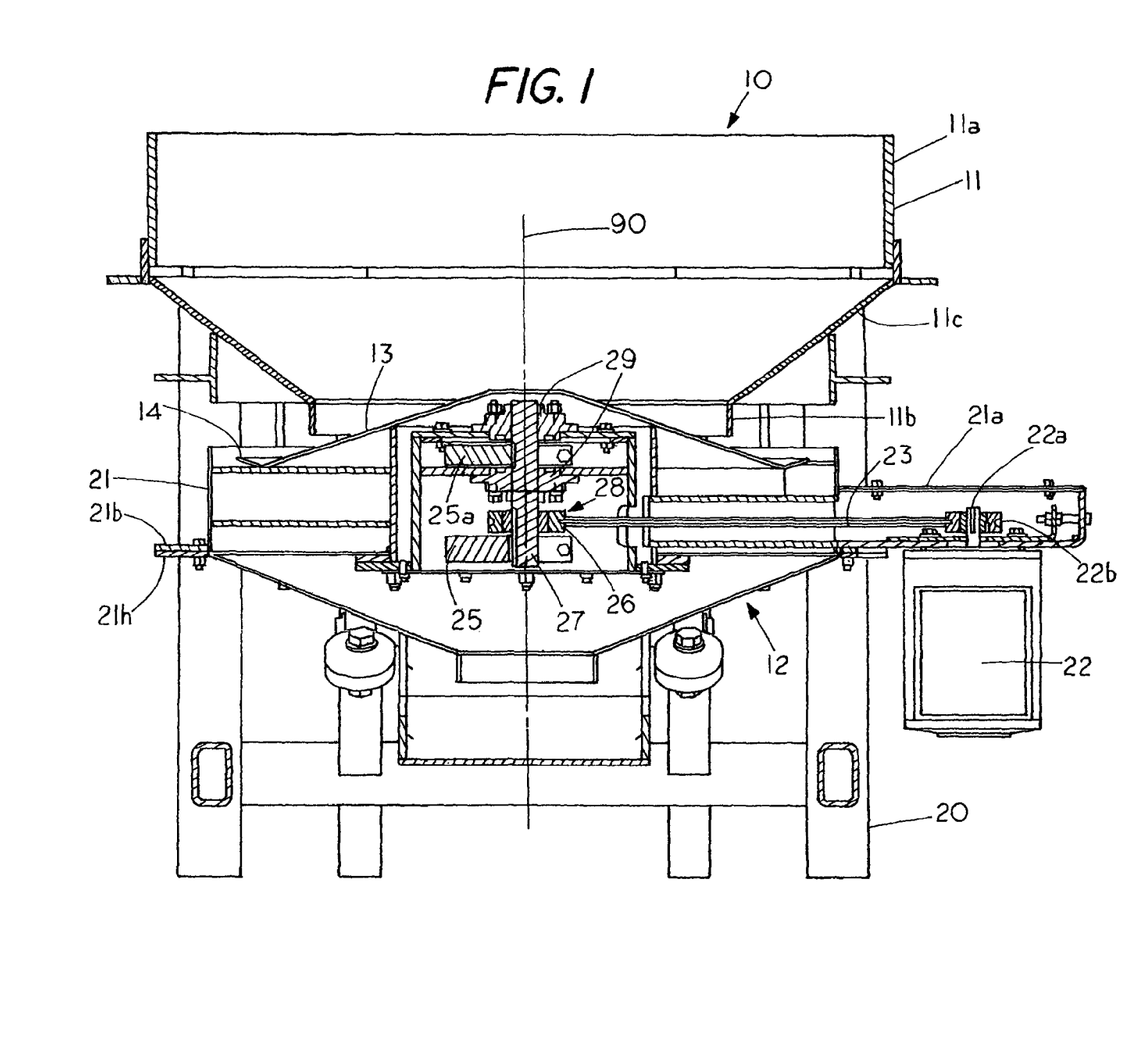
FIG. 1 is a partial sectional view of the gyrating bin discharger.

FIG. 1 shows a sectional view of a gyrator feeder 10 comprising a hopper 11 having a top cylindrical section 11a or inlet for placing materials into the hopper and a lower cylindrical section forming an outlet 11b. A conical sidewall 11c has a top end mating with cylindrical section 11c and a bottom section mating with cylindrical section 11b to provide a centrally funneling flow path for material as it flows through hopper 11. Positioned proximate the outlet 11b and partially obstructing the outlet 11b is a gyrator 12. Gyrator 12 includes a dispensing member 13, which in the preferred embodiment is a an activating cone that generally has a frusto conical shape. Dispensing member 13 has an annular lip 14 that extends upward at an angle to retain material thereon. The hopper 11 is fixedly supported by a stand 20 while the gyrator 12 is flexibly supported on stand 20 with gyrator 12 positioned below hopper 11 to receive material therefrom. (See FIG. 8) Reference numeral 90 indicates the vertical central axis 90 of the system 10. As can be seen in FIG. 1 gyrator 12 has dispensing member 13 partially obstructing the outlet 11b with the dispensing member having annular lip 14 for retaining a material thereon when gyrator 12 is in an off condition and for dispensing material thereover when the gyrator 12 is gyrating.

The gyrator 12 includes a gyrator housing 21 having a radial extension 21a with a drive motor 22 secured to the underside of radial extension 21a. Motor 21 has a motor shaft 22a with a drive pulley 22b secured thereto with the drive pulley 22b and motor shaft 22a extending into the interior space in housing radial extension 21a. A belt 23 connects drive pulley 22b to a pulley 26 on a rotateable member 22 that forms part of the internal gyrating unit 28. Rotateable member 22 comprises a vertical shaft 27 rotateable supported by bearings 29 with shaft 27 having offset weights 25 and 25a secured thereto. When motor 22 is activated it rotates shaft 27 through drive belt 23, which produces vibrations. However, instead of producing an up and down vibratory motion the off balance rotation of shaft 27 at the center of the gyrator housing produces a true circular orbital vibratory action of housing 21 as opposed to bin activators that have vibrator sources that are off set from the center. Consequently, with a true circular orbital vibratory motion the gyrator feeder delivers a more uniform flow.

In the embodiment shown in FIG. 1 the offset member for inducing the gyrations is centrally positioned in housing 21 with shaft 27 rotating about a central vertical axis 90 to thereby cause the gyrator housing 21 to provide true circular orbital vibratory motion of the dispensing member 13. That is the circular orbital vibratory motion occurs in an x-y plane because the offset weight is at the center rather than outside the center of the housing. Another embodiment for producing true circular orbital vibratory motion of the dispensing member 13 where vibrators are not located along a vertical central axis of the system is shown and described in FIGS. 12 and 13.

Figure 2:
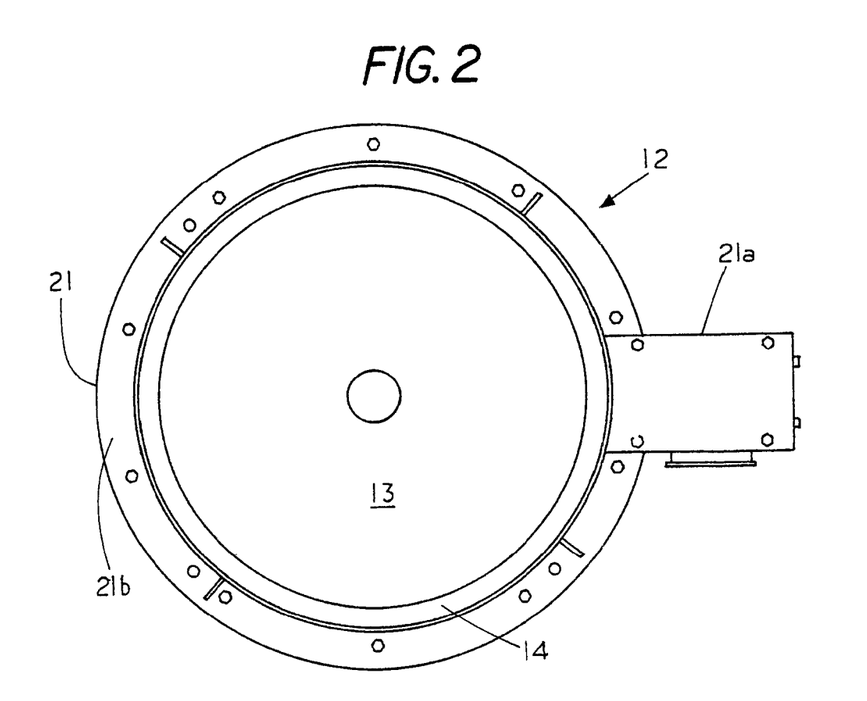
FIG. 2 is an isolated top view of the housing and the gyrating dispensing member.

FIG. 2 shows an isolated top view of the gyrator 12 showing the gyrator housing 21 with a flange 21b for flexibly supporting gyrator 12. Centrally positioned within gyrator housing 21 is the cone shaped dispensing member 13 having a peripheral annular lip 14. The annular lip is spaced from housing 21 as shown in FIG. 1 and FIG. 2 and is shown in greater detail in FIG. 10 and FIG. 11.

Figure 3:
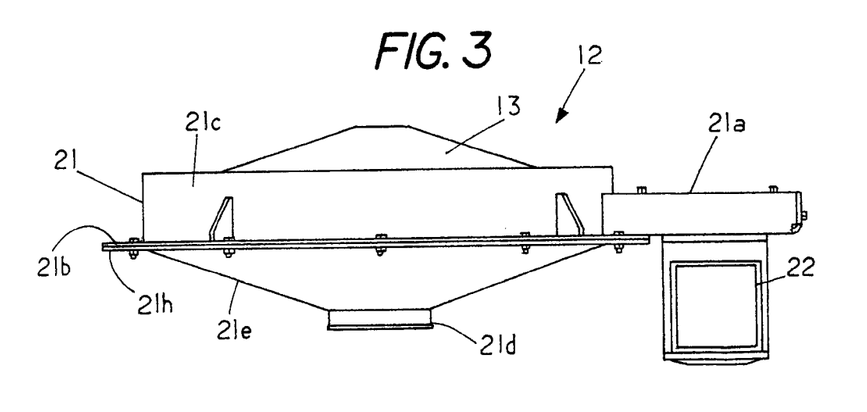
FIG. 3 is a side view of the housing and gyrating dispensing member of FIG. 2.

FIG. 3 shows the isolated side view of the gyrator 12 with a drive motor 22 secured to the underside of the housing extension 21a. A cylindrical member 21c extends upward from housing 21 and a cone shaped discharge member 21e having an outlet 21d extends downward from housing 21 with the members 21c and 21e secured to each other by bolts extending through flanges 21b and 21h.

Figure 4:
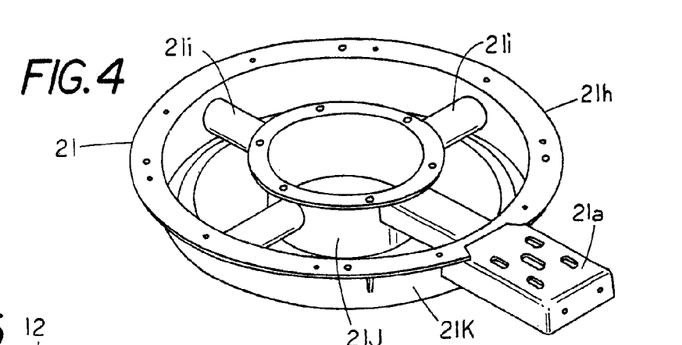
FIG. 4 is an isolated perspective of the housing without the gyrating dispensing member.

FIG. 4 shows an isolated top perspective view of a portion of housing 21 without the gyration unit. A set of radial spokes 21i connects the inner cylindrical housing member 21j with the outer cylindrical housing member 21k. The radial supports 21i provide for energy transfer from the inner cylindrical housing member 21j where the internal gyrating unit 28 is located.

Figure 5:
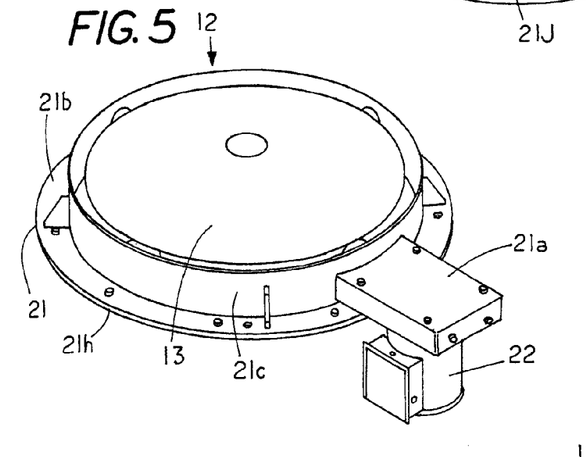
FIG. 5 is an isolated perspective view of the top of the housing with the gyrating dispensing member and the vibrator drive motor secured to the housing.
Figure 6:
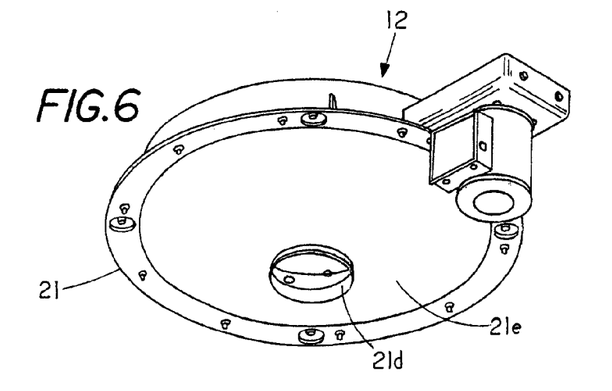
FIG. 6 is an isolated view of the bottom of the housing with the vibrator drive motor secured to the housing.

FIG. 5 shows an isolated top perspective view of gyrator 12, which is shown in top view in FIG. 2 and side view in FIG. 3. Dispensing member 13 is shown centrally positioned in cylindrical sidewall 21c. Similarly, FIG. 6 shows an isolated bottom perspective view of gyrator 12, which is shown in top view in FIG. 2 and in bottom view in FIG. 3. FIG. 6 shows the outlet 21d where material is discharged from gyrator housing 21

Figure 7:
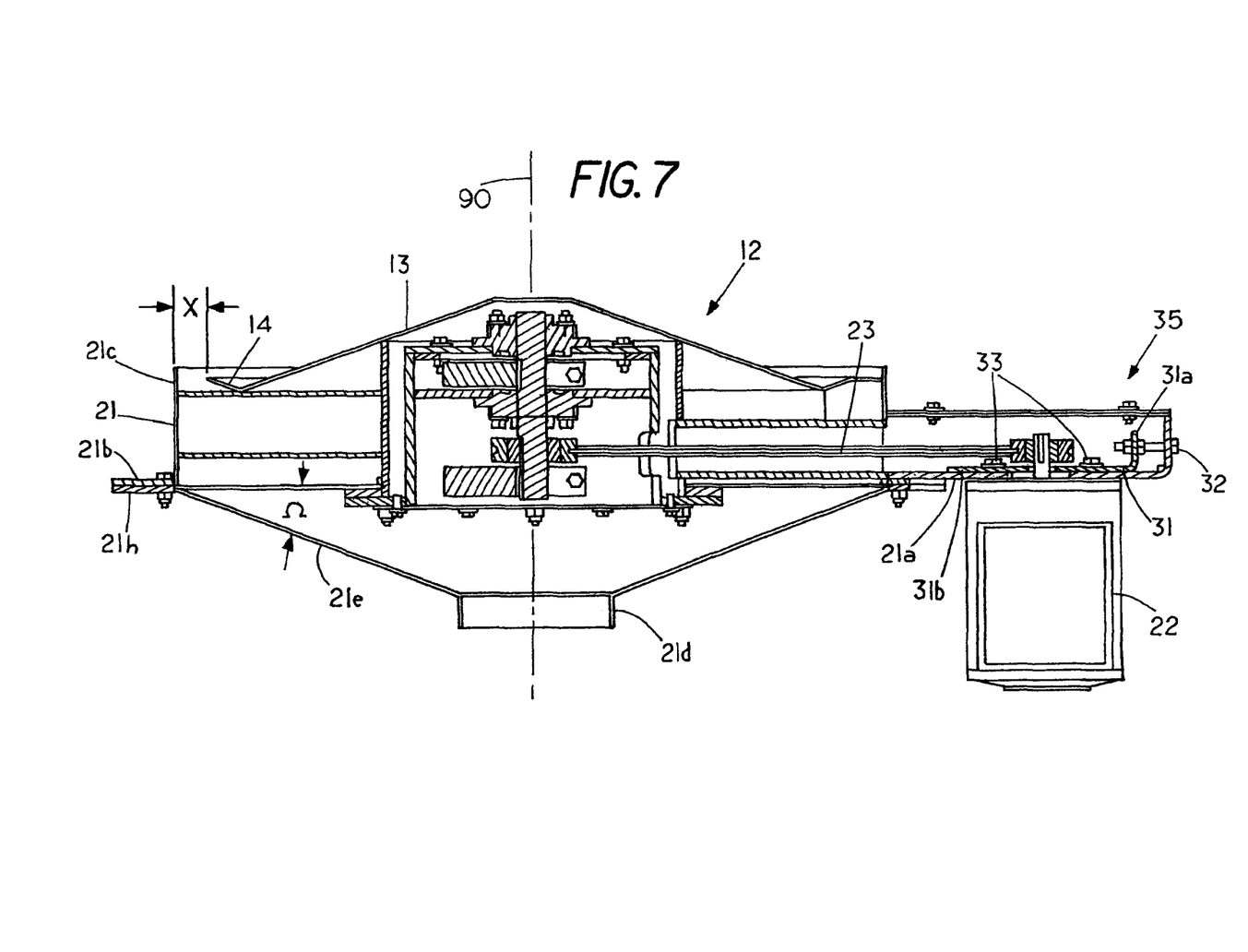
FIG. 7 is a sectional isolated view of the gyrating dispensing member and the vibrator drive motor.

FIG. 7 shows an isolated sectional view of gyrator 12 showing the annular distance x between the outer peripheral lip 14 and the cylindrical 21c that forms an annular flow path for material as it flows through gyrator 12. FIG. 7 also shows a belt tensioner 35 comprising an L-shaped member 31 that has one portion 31b secured to motor 22 and to housing extension 21a by stud bolts 33 and the other end 31a extending perpendicular therefrom to receive a bolt 32. As the drive belt 23 can stretch under use one can move the motor 22 radially outward to increase the tension on belt 23 by rotating bolt 32 which pulls arm 31a radially outward. Similarly, one can decrease the tension on belt 23 by rotating bolt 32 in the opposite direction, which causes the motor and drive shaft to move radially inward. Thus the tension of the belt can be adjusted without having to disassemble the housing extension 21a.

Figure 8:
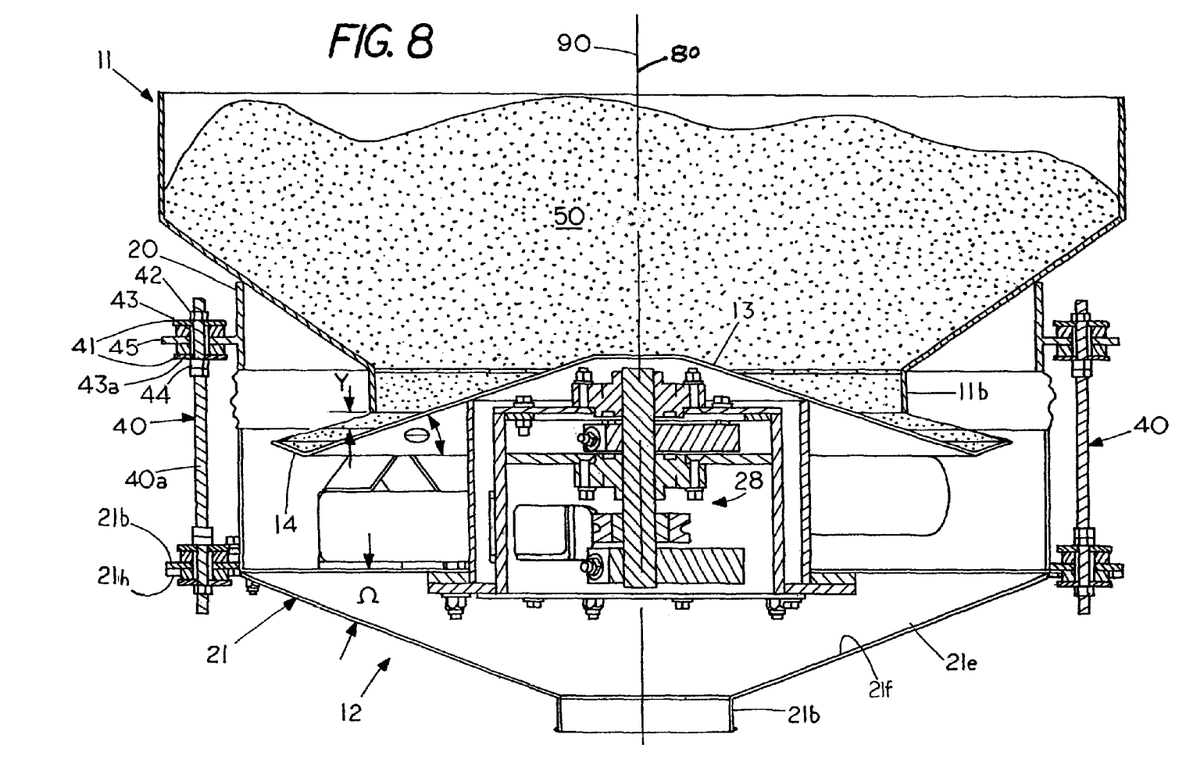
FIG. 8 is a partial sectional view of the hopper and the gyrating dispensing member when the vibratory drive motor is in the off condition.

FIG. 8 shows the gyrator 12 with the gyrator housing 21 flexibly supported from stand 20 by a set of radially positioned flexing members 40 that prevent rotation of dispensing member 13 but permit gyration of dispensing member 13 as well as provide uniform engagement of the flange 45 with the elastomers 41. Flexing members 40 comprise a threaded shaft 40a having one end with a set of elastomers 41 that sandwichingly engage a flange 45 on stand 20 and the opposite end with an identical set of elastomers 41 that sandwichingly engage the flange formed by flanges 21b and 21e.

Figures 8A, 9:
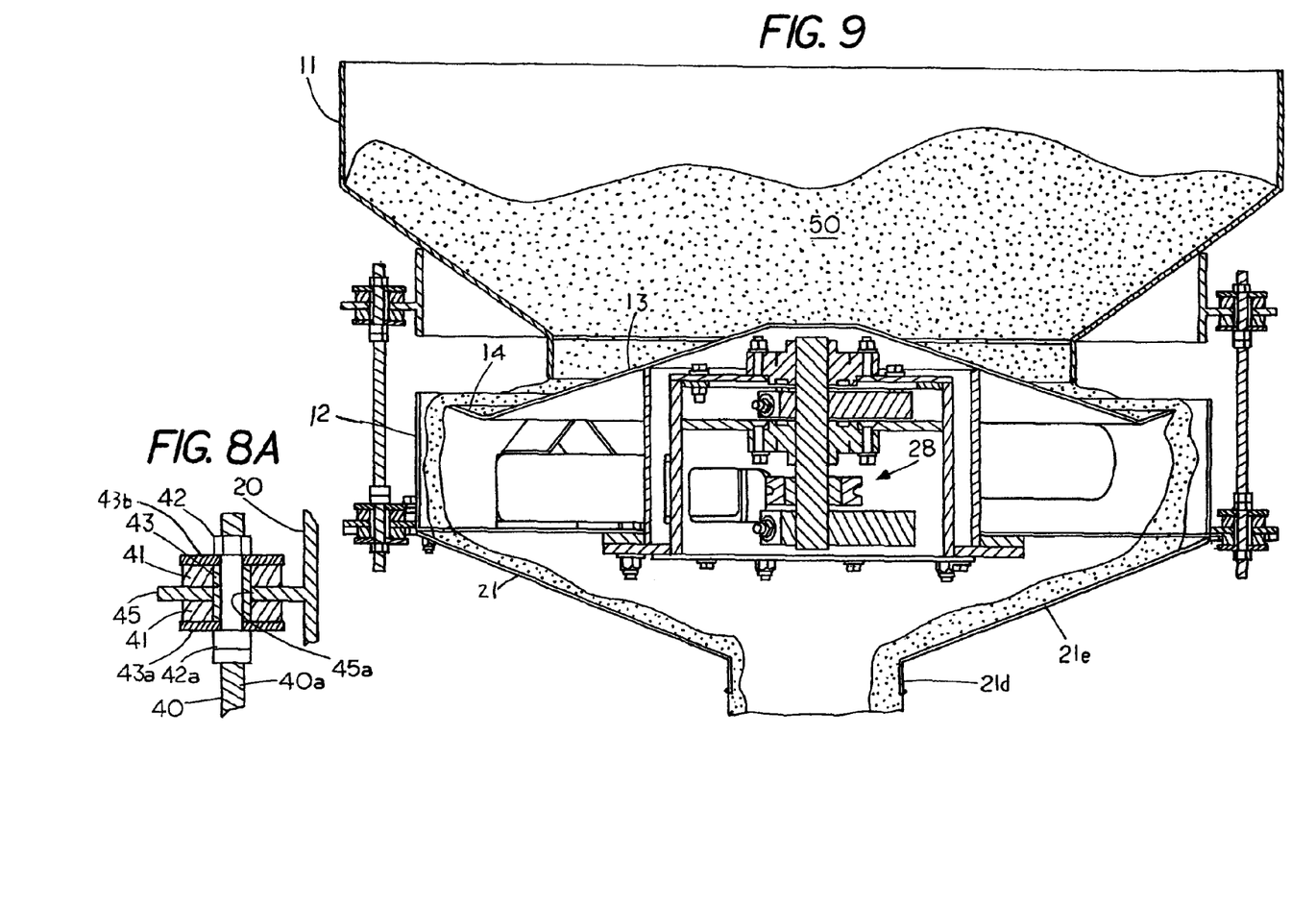
FIG. 8A shows an isolated detail view of a portion of flexible support.
FIG. 9 illustrates the material flow when the dispensing member is gyrated in a circular motion by the vibrator drive motor.

FIG. 8A shows an isolated detail view of a portion of flexible support 40 revealing a rigid sleeve 43 that extends around threaded shaft 40a with a top end of rigid sleeve 43 engaging a rigid washer 43 and the lower end of rigid sleeve 43 engaging a further rigid washer 43a. The sleeve 43 is clamped between a top rigid washer 43 and a lower rigid washer 43a by an upper nut 42 and a lower double nut 42a to form a rigid housing for the annular elastomers 41. Flange 45 has an opening 45a therein that allows the flange 45 to move up and down along sleeve 43. The rigid housing with the elastomers sandwichingly therebetween allows the flange to compressively and more uniformly engage each of the entire annular elastomers 41 during the operation of the gyrator 12. Similarly, an identical arrangement of a rigid sleeve and rigid washers is located in the lower portion of shaft 40a and is not described herein.

The use of elastomers 41 to interface the shaft 40a to both stand 20 and to gyrator 12 provides for both static and dynamic support of gyrator 12 to allow for vibration displacement of the gyrator 12 with respect to stand 20 while at the same time providing support to hold gyrator 12 in the dispensing condition proximate outlet 11b. An identical flexible support 40' is located on the opposite side of gyrator 12 and in the preferred embodiment flexible supports are circumferentially positioned around the gyrator 12 to provide 360 degree support to the gyrator 12.

FIG. 8 shows the material in hopper 50 maintaining itself in a nonflowable condition when the gyrator 12 is in the off condition. That is, the material 50 extends down along member 13 to a position were the up turned annular lip 14 retains the material thereon. A vertical distance Y denotes the distance between the bottom of outlet 11b and dispensing member 13 and is referred herein as the feed region height. In this condition material 50 in hopper can be maintained in an immediate ready to dispense condition without the use of a gate to shut off the flow of materials through correlation of the feed region height with the angle of repose of the material.

FIG. 8 also shows a lower dispensing cone 21 that receives material 50 forming an angle Ω with the horizontal. Dispensing cone 21 has a low friction surface 21f to allow material 50 to slide thereon and has the angle Ω greater than the angle of repose of the material to ensure that the material 50 being dispensed from hopper 11 will not accumulate thereon and can be carried quickly through outlet 21b. In some applications the lower dispensing cone 21 may not be used, in those cases the material is dispensed directly into another container as it falls off lip 14. When a lower dispensing cone is used the angle of the cone is selected so material will not adhere thereon in the static condition and in addition the slope and the outlet 21b should allow for removal of material faster than can be dispensed to avoid accumulating material on the lower dispensing cone that could choke off the flow. In addition, with a steep slope and low friction surface 21f the material can not accumulate on the lower dispensing cone 21, consequently, the lower dispensing cone will be free of material once the gyration of the feeder ceases.

FIG. 9 illustrates the flow of material 50 from hopper 11 to outlet 21d once the gyrator 12 is activated by powering the gyrating unit 28. Note, the material 50 flows over annular lip 14 and falls down unto lower converging cone 21, which directs the material to outlet 21d. That is, the gyrating motion of gyrator housing 21 causes the material to flow from hopper 11 to outlet 21d. By controlling the gyrations of housing 21 one can control the rate of material being dispensed. That is, by increasing the gyration action one can increase the flow of material while decreasing the gyration action allows one to decrease the flow of material. This is particularly useful if one is attempting to meter a precise amount of material into a container since one can decrease gyrating action as one approaches the amount of needed material to thereby provide a better topping off control.

Figure 10:
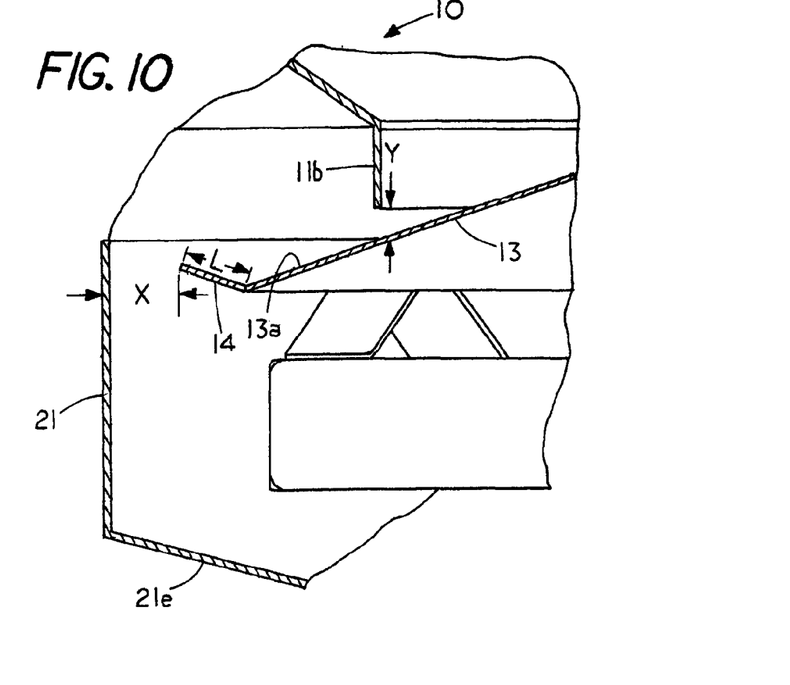
FIG. 10 is an isolated sectional view of the dispensing ledge and lip on the gyrating dispensing member for holding the material thereon at an angle less than the angle of repose of the material.

FIG. 10 shows a cross section view of dispensing lip 14 of length L positioned in housing 21 when hopper 11 is in an empty condition. In the embodiment shown the distance L denotes the length of annular lip 14. The distance x denotes the radial spacing between the peripheral edge of annular lip 14 and the housing 21 and Y (the feed region height) denotes the distance from the end of the outlet 11b to the surface 13a of dispensing member 13, which is the feed region that the material must flow through to leave hopper 10. In operation it is this distance Y, which will vary during the gyration of dispensing member 13, and it is the variation of the distance Y as the dispensing member 13 moves in response to the true circular orbital vibratory motion of the gyrator 12, which is illustrated in FIGS. 11A and 11B which causes material to flow along dispensing member 13 and over lip 14.

Figure 11:
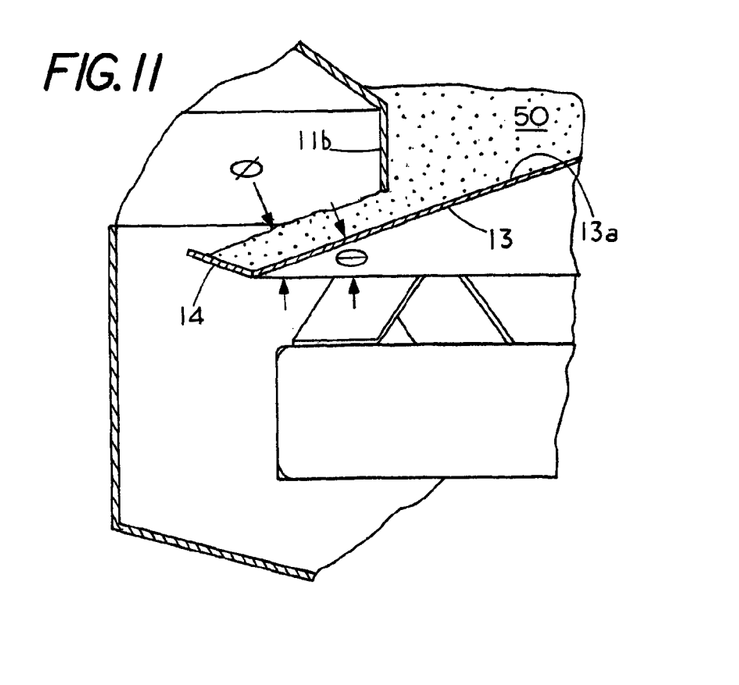
FIG. 11 shows the isolated section view of FIG. 10 with the dispensing material thereon.

FIG. 11 shows a static or no flow condition with material 50 located on the surface 13a of dispensing member 13, which partially obstructs the outlet 11b. The material on surface 13a of member 13 is held from flowing off by coaction of upward extending lip 14 and the material angle of repose (the steepest angle at which a sloping surface formed of a particular loose material is stable). By extending the lip 14 a length L upward the material stops flowing when the angle φ of the material is less than the angle of repose of the material thereon. The static or no flow condition is further illustrated in FIG. 8.

By selecting the distance Y such that the material 50 can settle on surface 13a at an angle less than the material angle of repose one prevents material from continuing to flow off the end of annular lip 14 when the gyration unit is in an off condition. That is, one selects the spacing Y such that the material 50 that is on surface 13a will flow along surface 13a but does not flow over lip when the dispensing member is not subject to gyrations. It should be understood that the spacing Y will vary depending on the material angle of repose as well as the type of material. In general, an operator adjusts or calibrates the spacing i.e. the feed region height, is set sufficiently high so the material that is in hopper 10 can flow down to lip along surface 13a but will not flow over the annular lip 14 when the gyrator is in the off condition. The static spacing of the feed region can be adjusted though lengthening or shortening the flexible supports 40 which are located circumferentially around gyrator housing 21.

Figure 11A:
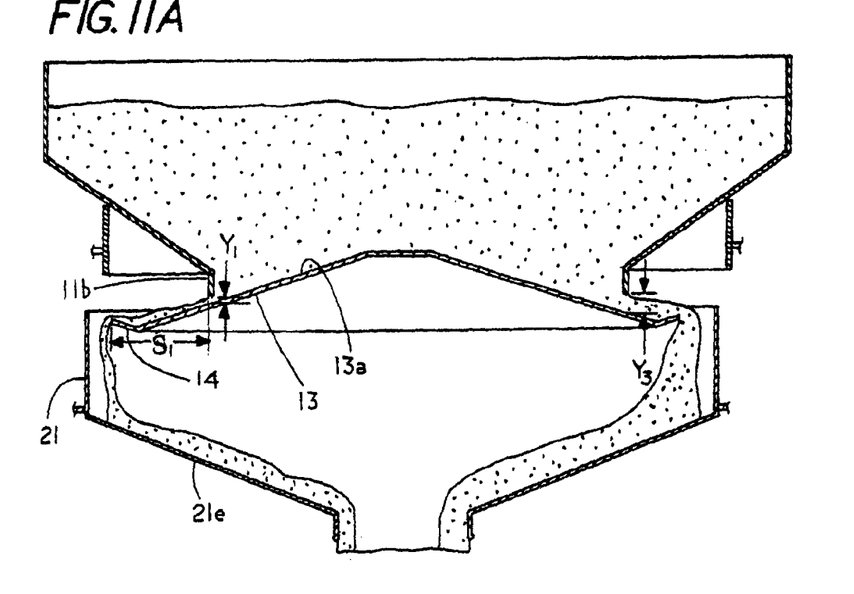
FIG. 11A is a partial cross section view of the dispensing member as it gyrates with respect to a hopper outlet.
Figure 11B:
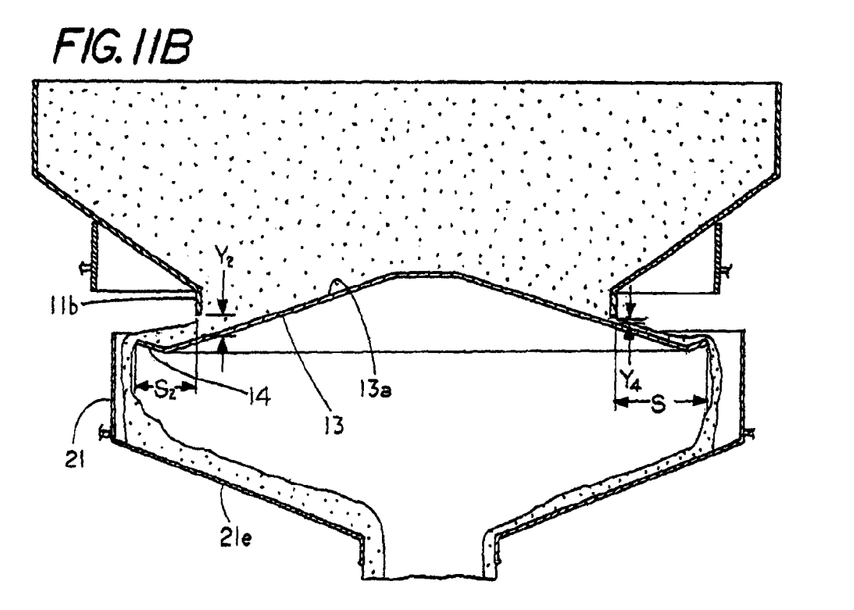
FIG. 11B is identical to the view of FIG. 11A except the dispensing member is in a different portion of the gyration cycle.

To appreciate the gyration of the dispensing member 13 reference should be made to FIG. 8, FIG. 11A and FIG. 11B which shows the static vertical axis 90 of the dispensing member in relationship to the dynamic central axis 80 of the dispensing member 13.

FIG. 8 shows the condition when there is no gyration of dispensing member 13, in this condition the static vertical axis 90 and the central axis 80 of dispensing member 13 are in alignment with each other.

FIG. 11A illustrates the dispensing member 13 at one point in the gyration cycle and FIG. 11B shows the dispensing member at a second point 180 degrees later in the gyration cycle. A reference distance $S_1$ indicates the distance of the vertical edge of lip to outlet 11b as a result of the lateral displacement (i.e. that is substantially in an x-y plane) of the dispensing member 13. In this condition the feed height $Y_1$ has decreased. However, on the opposite side the feed height $Y_3$ has increased since the dispensing member 13 has moved away from dispensing member 13.

FIG. 11b shows that the distance between the outlet 11b and the edge on the lip 14 is now $S_2$, which is less than $S_1$. Consequently, the feed region height $Y_2$ has increased and the feed region $Y_4$ on the opposite side has decreased through movement of the dispensing member substantially in the x-y plane.

Thus, the gyration of the dispensing member 13 in a true circular orbital vibratory motion causes a local uniform flow of material over the lip 14 as the feed region height increases. Since the feed height region increases at a uniform rate the flow over the edge of the lip remains uniform as the delivery of the material makes a 360 sweep around the dispensing member 13.

Figure 11C:
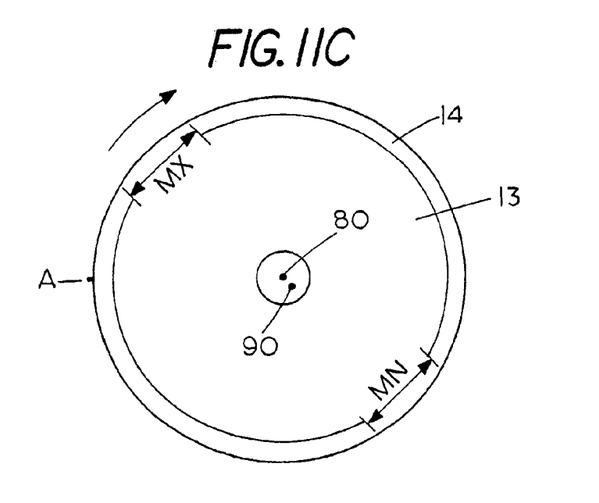
FIG. 11C shows a top isolated view of the dispensing member with a central axis in a first off vertical condition.
Figure 11D:
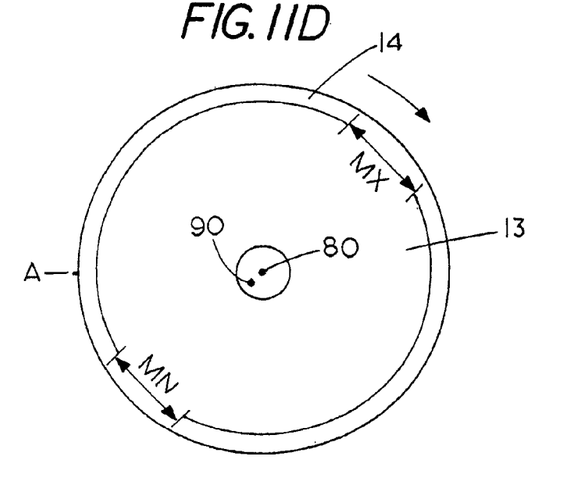
FIG. 11D shows the top isolated view of the dispensing member of FIG. 11C with the central axis of the dispensing member in a second off vertical condition.

FIG. 11C and FIG. 11D are schematic of the top of cone with two areas of flow designated. FIG. 11C shows a region designated by Mx where there is maximum flow over the annular lip 14 of dispensing member 13 and the region designated by Mn, which is diametrically opposite and has minimum or no flow. A point A has been marked on cone 13 in both FIGS. 11C and 11d to show that the cone 13 does not rotate. As the gyration continues the region of maximum flow Mx moves clockwise around the cone 13 as illustrated in FIG. 11D which shows that both the region Mx and Mn have rotated about 90 degrees from their original position. The dynamic position of the central axis 80 of the dispensing member 13 is indicated by reference numeral 80 while reference numeral 90 indicating the static location of dispensing member central axis if the dispensing member 13 were at rest.

Figure 11E:
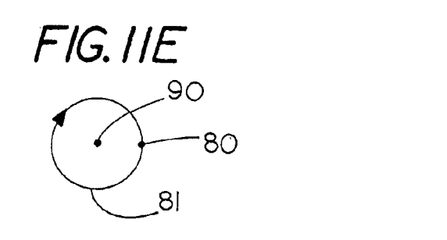
FIG. 11E is a schematic of the circumnavigating path of the dispensing member axis about a vertical axis.

FIG. 11E shows a top view of the static vertical axis 90 with the circumnavigating path 81 of the dynamic dispensing member axis 80 about the static vertical axis 90. The arrows indicate that the dynamic axis 80 follows a circular like path about static vertical axis 90 during the circular orbital gyration of dispensing member 13.

As illustrated by the drawings the gyration of dispensing member 13 causes a portion of the cone surface 13 to be closer to the edge of outlet 11*b* and a portion to be further from the edge of outlet 11*b*. However, as the cone 13 gyrates the distance Y which causes flow along the cone surface 13*a* travel 360 degrees around the outlet 11*b* and in doing so cause the rate of material 50 flowing over the lip to locally increase.

Because the dispensing member 13 gyrates the maximum distance variation between the cone surface 13*a* and the outlet 11*b* circumnavigates around the outlet 11*b* thereby causing maximum material to flow when a portion of cone is in the position shown in the left side of FIG. 11B and no flow or low flow when the cone surface 13*a* is in the position shown in the left side of FIG. 11A.

Thus the gyration of cone 13 causes the spacing Y between the hopper lip 11*b* to vary with the variation in spacing circumnavigating around the hopper lip 11*b*. The localized flow of material increases with increased spacing Y and decreases with a decrease in spacing Y. As a result the flow of material from one portion of the hopper and then from adjacent portion of the hopper circumnavigates around the dispensing manner in a manner similar to a wave propagating.

Figure 12:
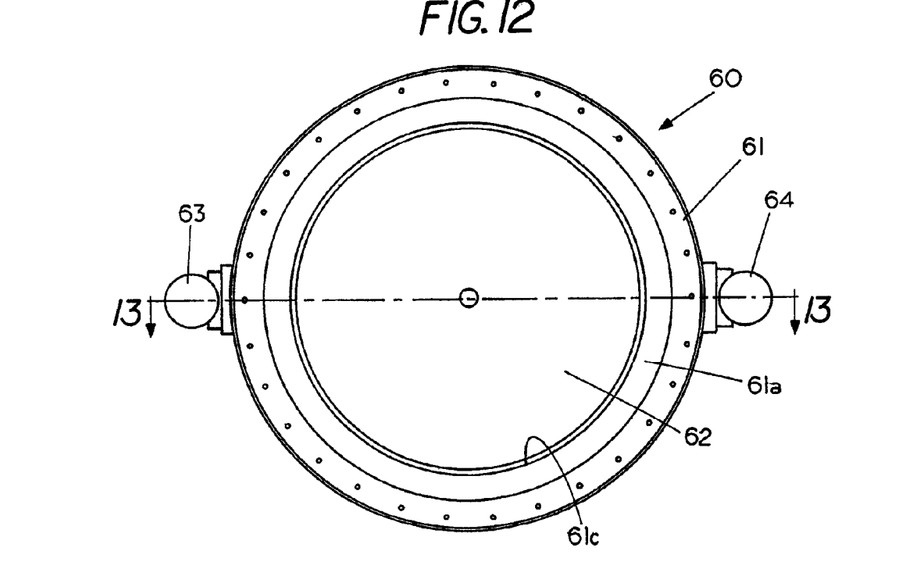
FIG. 12 shows a top view of an alternate embodiment of a bin discharger with two vibratory motors located diametrically opposite each other on the gyrator housing.
Figure 13:
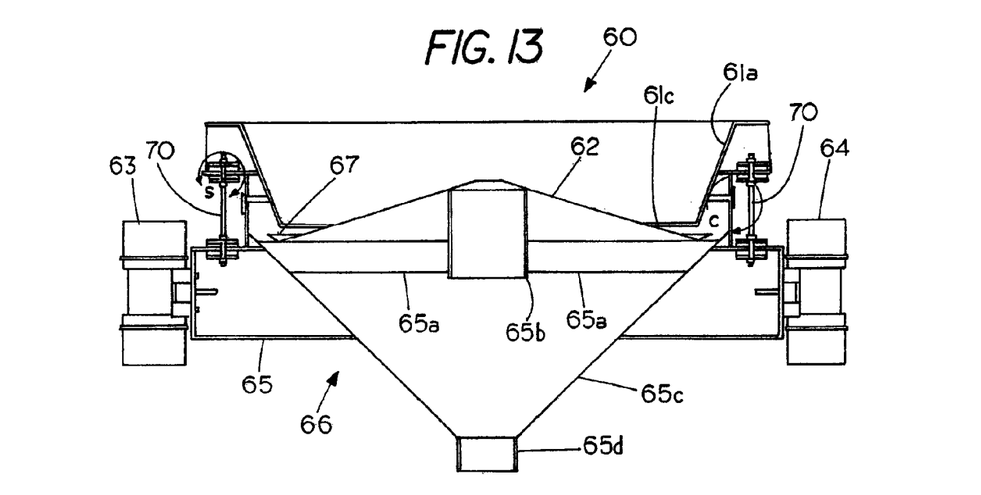
FIG. 13 shows a side sectional view of the alternate embodiment of a bin discharge of FIG. 11 with two vibratory motors located diametrically opposite each other on the gyrator housing.

FIG. 12 shows a sectional view of an alternate gyration bin discharge system 60 and FIG. 13 shows a section view of the bin discharge system 60 taken along lines 13-13 of FIG. 12. Bin discharge system 60 includes a hopper 61 having a top section 61*a* or inlet for placing materials into the hopper and a lower cylindrical a hopper outlet 61*c* that funnels material into a gyrator 66. The alternate embodiment shown in FIGS. 12 and 13 also produces a true circular orbital vibratory motion of the dispensing member even though the gyration unit is not located along a static vertical axis of the gyrator housing.

FIG. 12 shows the gyrator 66 includes a gyrator housing 65 having a first vibratory motor 63 mounted on one side of housing 65 and a second vibratory motor 64 mounted diametrically opposite. The gyrator housing 65 includes a cone shaped dispensing member 62 having an annular lip 67 and an interior radial members 65*a* with a hub 65*b*. A conical shaped member 65*c* funnels material into outlet 65*d*. In the embodiment of FIG. 13 the actual unit that produces the gyration of the gyrator housing 65 is not located in the center as shown in FIG. 1 but is located external to the gyrator housing 65. The annular lip and the relationship to the hopper is identical that is described in FIGS. 1-11 and will not be described herein.

The gyrator feeder 60 differs from the bin gyrator feeder 10 in that the gyrator housing 12 has a single vibration producing unit i.e. the off set rotateable weights located on a vertical central axis of the gyrator with the drive motor 22 located on the peripheral portion of the housing 12. In contrast, the gyrator housing 66 has two vibration producing units i.e vibratory motors, wherein both the vibratory motors are radially spaced from the central axis 73 of the gyrator 66. In this embodiment a drive motor and a set of offset weights are in the same location, that is both vibratory motor 63 and vibratory motor 64 include a drive motor and a set of offset rotateable weights comprising the gyration unit that are directly coupled to the motor drive shaft. By having the vibratory motor 63 and 64 positioned diametrically opposite from each other one can induce a true circular orbital vibratory motion in gyration housing 65, when it is flexibly suspended by flexible supports 70, which are identical to the flexible supports shown in FIG. 8.

In order to achieve a true circular orbital vibratory motion FIG. 12 the vibratory motors 63 and 64 are synchronized with the motors rotating in the same direction. In the synchronized condition the weights are in the same position for each vibratory motor. That is, if the offset weight in vibratory motor 63 is at the 3 o'clock position the offset weight in the motor 64 will also be at the 3 o'clock position. As a consequence the dispensing member 62 produces a true circular orbital vibratory motion in the x-y plane.

Thus, the rotation of off balance shafts at opposite sides of the gyrator housing 65 can also produces a lateral gyrating action of housing 65 i.e., a true circular orbital vibratory motion or lateral side-to-side motion as differentiated from up and down motion found in conventional vibration bin dischargers as well as elliptical orbit motion found in some units which produce non-uniform dispensing rates Thus the invention includes the method of dispensing material comprising the steps of: placing material in a hopper having an outlet edge; and gyrating a dispensing member located below the outlet edge to cause the dispensing member to simultaneously and circumferentially vary the distance between the outlet edge and the dispensing member to thereby increase the flow along a portion of the dispensing member and decrease the material flow along another portion of the dispensing member. The invention also includes a method of stopping the gyration to shut off the flow over the dispensing member while maintaining an open spacing between the outlet edge and the dispensing member which can be obtained by having the opening spacing Y maintained at a distance such that the angle of the material on the dispensing member 13 which flows through the feed region does not exceed an angle of repose of the material.

We claim:

1. A gyrator feeder for generating a true circular orbit comprising:
   a hopper having a top cylindrical section having a conical sidewall having an open end cylindrical outlet edge extending across a bottom end of the conical sidewall for receiving a dispensing material;
   a stand fixedly supporting said hopper;
   a gyrator having a having a static central vertical axis;
   a cone shaped dispensing member having a downward sloping surface extending beneath the cylindrical outlet edge and past the open end of the top cylindrical section for partially obstructing the cylindrical outlet with the dispensing member having an open vertical spacing between the outlet edge on said cylindrical outlet and the downward sloping surface during either a dispensing condition or a non dispensing condition said downward sloping surface of said dispensing member having a feed region extending radially outward of the cylindrical outlet edge to an annular upward extending peripheral lip located radially outward from the cylindrical outlet edge with said upward extending peripheral lip angled upward from said downward sloping surface for retaining a material on the downward sloping surface of cone shaped dispensing member when said gyrator is in an off condition even though the downward sloping surface of the cone shaped dispenser remains spaced from the cylindrical outlet edge and for dispensing material thereover when the gyrator is gyrating, a set of flexible supports located between said stand and said gyrator with said supports paced around said housing with each of said flexible supports comprising a shaft having one end with a set of elastomers that sandwichingly engages a flange on the stand and an opposite end with a set of elastomers that sandwichingly engage a flange on the housing, with each of said flanges including an opening to allow the flange to move up and down with respect to the shaft for flexibly supporting said gyrator on said stand to permit gyration of said gyrator with respect to said outlet of said hopper with said gyrator having an internal gyrating unit located along the static central vertical axis with the internal gyrating unit powered by a motor located radially off center of said gyrator and the dispensing member having a dynamic central axis that circumnavigates about the static central vertical axis of the dispensing member; and a cone shaped discharge member having a radial extension extending vertically upward above the annular upward extending peripheral lip for receiving material falling from said lip with the cone shaped member having a converging surface to allow the material falling from said lip to flow unimpeded therealong to a central outlet located in said cone shaped member.

2. The gyrator feeder of claim 1 wherein the gyrator includes a drive belt connected to the internal gyration unit and a tensioner for adjusting the tension of the drive belt.

3. The gyrator feeder of claim 1 wherein the internal gyrating unit has a rotateable shaft with an offset weight.

4. The gyrator feeder of claim 1 wherein the lip of the gyrator is an annular lip that is circumferentially spaced from cylindrical outlet edge to permit material flow therepast.

5. A gyrator feeder comprising: a stand; a hopper having an outlet; a housing; a gyrator comprising a first vibratory motor mounted on one side of said housing and a second vibratory motor mounted on an opposite side of said housing wherein the first vibratory motor and the second vibratory motor are synchronized with the first vibratory motor and the second vibratory motor rotating in the same direction; a dispensing member partially obstructing the outlet with the dispensing member having a lip for retaining a material thereon when said gyrator is in an off condition and for dispensing material thereover when the gyrator is gyrating; and a set of flexible supports spaced around said housing with each of said flexible supports comprising a shaft having one end with a set of elastomers that sandwichingly engaging a flange on the stand and an opposite end with a set of elastomers that sandwichingly engage a flange on the gyrator housing, with each flange including an opening to allow the flange to move up and down with respect to the shaft for supporting said gyrator to permit gyration of said dispensing member with respect to said outlet.

6. A gyrator feeder for generating a true circular orbit comprising: a stand; a gyrator housing; and a hopper having an outlet with said hopper fixedly supported on said stand; a set of flexible supports spaced around said gyrator housing with each of said set of flexible supports comprising a shaft having one end with a set of elastomers that sandwichingly engaging a flange on the stand and an opposite end with a set of elastomers that sandwichingly engage a flange on the gyrator housing, with each flange including an opening to allow the flange to move up and down with respect to the shaft; a gyrator having a dispensing member flexibly supported on said stand with said gyrator partially obstructing the outlet with the dispensing member having a lip for retaining a material thereon when said gyrator is in an off condition and for dispensing material thereover when the gyrator is gyrating, wherein the dispensing member extends radially beyond the outlet but spaced from the outlet to thereby partially obstruct but not block a flow passage between the outlet and the dispensing member, said gyrator comprising either a gyrating unit located along a central axis of said gyrator housing or a first vibratory motor mounted on one side of said gyrator housing and a second vibratory motor mounted on an opposite side of said gyrator housing wherein the first vibratory motor and the second vibratory motor are synchronized with the first vibratory motor and the second vibratory motor rotating in the same direction.

7. The gyrator feeder of claim 6 wherein the first vibratory motor and the second vibratory motor are positioned radially outward from a central axis of the gyrator.

8. The gyrator of claim 6 wherein the gyration unit comprising the first vibratory motor is radially spaced from a central axis of the gyrator housing and the second vibratory motor is radially spaced from the central axis of the gyrator housing.

9. The gyrator of claim 6 wherein the lip comprises an annular lip that extends upwardly to maintain material on a dispensing member when the gyration unit is in an off condition.

10. The gyrator feeder of claim 6 wherein the hopper is a gravity feed hopper and the gyrator is mounted below the gravity feed hopper with the flexible supports circumferentially positioned around said gyrator.

* * * * *

UNITED STATES PATENT AND TRADEMARK OFFICE
CERTIFICATE OF CORRECTION

Page 1 of 2

PATENT NO.       : 9,688,467 B2
APPLICATION NO.  : 14/825026
DATED            : June 27, 2017
INVENTOR(S)      : Christianson et al.

It is certified that error appears in the above-identified patent and that said Letters Patent is hereby corrected as shown below:

On the Title Page

Item (57)
In the abstract Line 2, "CIRCUMNAVIGATING" should read —CIRCUMNAVIGATINGLY—
In the abstract Line 6, "DIAMETRICAL" should read —DIAMETRICALLY—

In the Claims

Column 8, Line 50, "Having a Having" should read —Having—
Column 9, Line 5, "SAID SUPPORTS PACED" should read —SAID SUPPORTS SPACED—
Column 9, Line 10, "ENGAGE A FLANGE" should read —ENGAGES A FLANGE—
Column 9, Line 36, "FROM CYLINDRIAL" should read —FROM A CYLINDRICAL—
Column 10, Line 1, "SANDWICHINGLY ENGAGING" should read —SANDWICHINGLY ENGAGES—
Column 10, Line 3, "SANDWICHINGLY ENGAGE" should read —SANDWICHINGLY ENGAGES—
Column 10, Line 9, "AND A HOPPER" should read —A HOPPER—
Column 10, Line 12 "SAID SET OF FLEXIBLE SUPPORTS" should read —SAID FLEXIBLE SUPPORTS—
Column 10, Line 14 "ENGAGING A FLANGE" should read —ENGAGES A FLANGE—
Column 10, Line 15 "SANDWICHINGLY ENGAGE" should read—SANDWICHINGLY ENGAGES—
Column 10, Line 18 "SHAFT; A GYRATOR" should read —SHAFT; AND A GYRATOR—
Column 10, Line 37 "THE GYRATOR OF CLAIM 6" should read —THE GYRATOR FEEDER OF CLAIM 6—
Column 10, Line 42 "THE GYRATOR OF CLAIM 6" should read —THE GYRATOR FEEDER OF CLAIM 6—

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,688,467 B2

Column 10, Line 47 "GRAVITY FEED HOPPER" should read —GRAVITY FED HOPPER—
Column 10, Line 48 "GRAVITY FEED HOPPER" should read —GRAVITY FED HOPPER—